Figure 1:
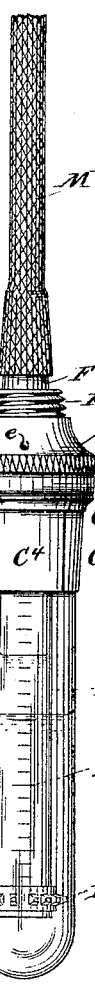

No. 622,761. Patented Apr. 11, 1899.
E. D. DENSMORE & G. LE CLEAR.
PRESSURE GAGE.
(Application filed Dec. 31, 1897.)

(No Model.)

Witnesses
Harry F. Carrington
R. H. Connor

Inventors
Edward D. Densmore &
Gifford Le Clear.
By their Attorney
Charles R. Searle.

UNITED STATES PATENT OFFICE.

EDWARD DANA DENSMORE, OF SOMERVILLE, AND GIFFORD LE CLEAR, OF CAMBRIDGE, MASSACHUSETTS.

PRESSURE-GAGE.

SPECIFICATION forming part of Letters Patent No. 622,761, dated April 11, 1899.

Application filed December 31, 1897. Serial No. 665,112. (No model.)

*To all whom it may concern:*

Be it known that we, EDWARD DANA DENSMORE, residing in Somerville, and GIFFORD LE CLEAR, residing in Cambridge, in the county of Middlesex and State of Massachusetts, citizens of the United States, have invented a certain new and useful Improvement in Pressure-Gages, of which the following is a specification.

The invention relates to that class of gages in which the difference in level shown by a liquid contained in two portions of the gage is utilized in determining the difference in pressure to which the portions are subjected.

In the most common form a glass tube bent to U form is partially filled with liquid subject to atmospheric pressure in one branch and to the pressure to be measured in the other branch. The resulting difference in level in the two branches corresponds to the difference in pressure and is read on a scale usually placed between the branches and serving for both. It frequently happens in practice that the level in each branch lies between divisions on the scale, and the fraction thus produced must be estimated. Thus is introduced a source of error depending in degree on the skill and experience of the observer. The bent tube is usually mounted on a backboard, the branches widely separated to avoid a sharp bend and to allow space for the scale. The result is a cumbersome instrument, hard to keep clean and therefore difficult to read, especially in the dimly-lighted locations in which it is frequently used. Another and even more serious fault lies in the error in reading, due to slight inclinations of the instrument out of the perpendicular, increasing as the branches are more widely separated and as the angle of inclination is farther from the perpendicular.

The object of our invention is to provide an instrument in which these objectionable features are entirely eliminated or at least reduced to a minimum.

It consists, essentially, of two straight cylindrical tubes of glass of different diameters mounted one within the other and movable axially relatively to each other. The inner tube depends from a tubular plug forming part thereof and joined to the open end of the outer tube. The inner tube reaches nearly to the closed end of the outer tube and carries a scale etched or otherwise produced thereon. A liquid introduced within and partially filling the outer tube stands, when the pressures are equal, at the same height and level in both. On connecting the inner tube with the space in which the pressure is to be measured the level immediately rises or sinks in the inner tube and correspondingly sinks or rises in the outer tube. The difference is read on the scale, and if there be fractions the inner tube is raised or lowered relatively to the outer tube until one level coincides with a division on the scale, thus reducing the liability of error in determining the fractions by reducing the number of estimates from two to one. The liquid standing practically in a single column, slight inclinations produce inappreciable differences in level, and a further advantage lies in the fact that if the connection from the inner tube to the chamber under investigation be flexible—as, for instance, a light rubber tube—the gage may hang suspended thereon and will by its gravity automatically assume the perpendicular.

Our improved gage is simple, effective, inexpensive, and is easily kept clean and in condition for service under all circumstances. It is compact and may be easily carried in the pocket and is extremely accurate in its operation.

The invention also consists in certain details of construction and arrangement of parts, which will be hereinafter fully described.

The accompanying drawings form a part of this specification and represent what we consider the best means for carrying out the invention.

Figure 2:
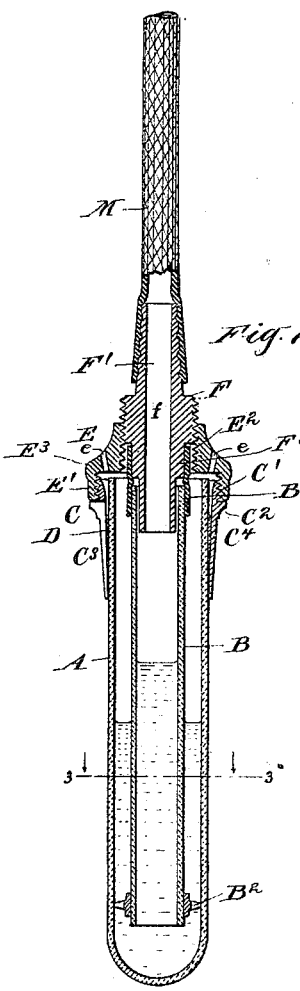
Figure 3:
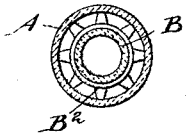

Figure 1 is an elevation. Fig. 2 is a corresponding central vertical section. Fig. 3 is a horizontal section taken on the line 3 3 in Fig. 2.

Similar letters of reference indicate the same parts in all the figures.

A is the outer tube of glass, having the lower end closed and preferably rounded, as in ordinary test-tubes, and the upper open end received in a wide collar C, of brass or other suitable material, the upper portion of which is screw-threaded externally, as at C', and having the bead or shoulder C². The lower portion tapers slightly, forming the flange C³, and is divided by vertical cuts or narrow slits into several tongues C⁴, adapted by their elasticity to grasp and hold the upper end of the tube A received within them. A gasket of soft rubber D may surround the tube to prevent contact between the metal and glass and reduce the liability of fracture.

E is a cap having an annular lip E', screw-threaded internally and matching to the threads C' on the collar, on which it is screwed home against the shoulder C⁷. The central portion of the cap is thickened and is drilled and tapped axially, as shown at E². Smaller openings or passages e e are produced, communicating between the interior of the cap and outer tube and the external air.

F is a tubular plug forming a part of the inner tube B. The central portion is larger than the ends and is screw-threaded to match loosely to the threads E² in the cap, so as to be adjusted axially therein. The upper extension F' is corrugated circumferentially to receive and hold one end of a rubber tube M of small diameter leading from the chimney or other chamber (not shown) in which the pressure is to be measured. The lower end of the plug is formed into the nipple F².

The inner tube B is also of glass, of smaller diameter and less length than the outer tube, and is inclosed within the latter. It is open at both ends and is joined to the nipple F² by a sleeve B', of rubber, fitting closely to both and forming an air-tight connection between the inner tube and plug, but having sufficient stiffness to hold the tube B centrally at the upper end within the tube A. The lower end is centered by a star-shaped washer B², of hard rubber or other material, the points of which touch the interior surface of the outer tube, but allow free circulation past them through the intervening spaces. A scale B³ is etched upon the outer face of the tube B and may be easily read through the transparent outer tube A.

In using the gage to determine the draft in a chimney the cap E and collar C are separated by unscrewing the former and removing it and its attached parts. Water or other liquid is then supplied to the outer tube until it is partly filled. The removed parts are then replaced, the star-shaped washer B² sinking freely in the liquid, and the latter comes to rest with its level in the same horizontal plane in both tubes. The rubber tube M is then attached to the extension F', and through the opening f and sleeve B' puts the interior of the tube B in communication with the interior of the flue into which the other end of the tube M is introduced. If there be sufficient draft to influence the instrument, a partial vacuum is formed and the level in the inner tube immediately rises, while that in the outer tube under atmospheric pressure correspondingly sinks. The difference in the levels indicates the difference in pressure measured by the height of the column of liquid and may be read on the scale in millimeters or tenths of an inch, or both, according as the scale is divided. If the levels coincide with divisions on the scale, the height of the column may be easily determined; but if, as is generally the case, neither level is exactly in line with a division the tube M and plug F are held stationary in one hand, while with the other the outer tube, with the collar C and cap E, is turned by means of the milled rim E³ and raised or lowered until the desired level is brought exactly in line with one of the scale-marks. The whole fraction is thus transferred to the other end of the column and is read as one fraction. The reading is thus simplified and the danger of error in computing the fractional parts of the scale-divisions greatly reduced.

Angular inclinations do not greatly affect the accuracy of the readings for the reason that the separation of the levels is practically in the vertical direction only and not laterally, as in the U-shaped tubes commonly used, in which the error increases as the tubes are farther apart. The weight of the gage, with its contained liquid, is disposed equally in all directions laterally, so that the center of gravity lies in the axial line, and as the latter is also the line of suspension when hanging freely at the end of the flexible tube M it follows that the instrument will automatically assume and maintain itself in the perpendicular, and thus avoid any error due to inclination.

Our gage is self-contained and may be easily carried in the vest-pocket either with or without an inclosing case, the rubber sleeve B' and gasket D contributing sufficient elasticity to insure against breaking under ordinary conditions and strains. The outer tube being of glass and without reëntering angles and crevices may be easily kept bright and clean, and as the openings e in the cap are small there is little danger of dirt finding its way to the interior. In any case the parts are readily separated and may be cleaned and replaced.

Modifications may be made in the forms and proportions without departing from the principle or sacrificing the advantages of the invention.

Although we have described the invention as serving as a draft-gage, it will be understood that it will, as shown, serve successfully in measuring slight pressures instead of partial vacuums and by lengthening the inner and outer tubes will correspondingly indicate greater differences in pressure.

In reading the scale as represented in the drawings it is necessary to subtract the lower figure from the higher to arrive at the height of the column. The scale may, however, be numbered in both directions from a central zero-mark, in which case the pressure will be read by adding the figures indicated by the levels above and below that mark.

The materials employed may be varied, and the means of connecting the parts together may be changed. The inner tube may be arranged to simply slide through the cap and be held frictionally therein at the desired height.

We prefer the whole as shown.

We claim—

1. A transparent outer tube closed at the lower end and adapted to contain a liquid, the open upper end in communication with the atmosphere, a cap carried at the said upper end, a plug adjustable axially in said cap, a transparent inner tube open at both ends extending into said outer tube and carried by said plug, a scale on said inner tube, and means as a flexible tube joined to said plug and communicating the pressure to be measured to said inner tube, all combined and arranged to serve substantially as and for the purposes herein specified.

2. The outer tube A and cap E having the openings $e$, and spring-collar C carried by said tube and receiving said cap, in combination with the plug F, extension F' and nipple F$^2$ thereon, the inner tube B and sleeve B' connecting it to said nipple, and the washer B$^2$ carried by the inner tube at its lower end, all substantially as herein specified.

In testimony that we claim the invention above set forth we affix our signatures in presence of two witnesses.

EDWARD DANA DENSMORE.
GIFFORD LE CLEAR.

Witnesses:
ARTHUR H. RUSSELL,
EDWARD M. MOORE.